United States Patent
Auf Der Heide et al.

[19]

[11] Patent Number: 5,951,943
[45] Date of Patent: Sep. 14, 1999

[54] PROCESS AND APPARATUS FOR CONTINUOUSLY FORMING RINGS OF THERMOPLASTIC, SHRINKABLE TUBULAR CASINGS

[75] Inventors: Dirk Auf Der Heide, Alfhausen; Christian Auf Der Heide, Osnabrueck; Alois Weinheimer, Alzey; Dieter Uhlmann, Wiesbaden, all of Germany

[73] Assignee: Kalle Nalo GmbH, Wiesbaden, Germany

[21] Appl. No.: 08/977,624

[22] Filed: Nov. 25, 1997

[30] Foreign Application Priority Data

Dec. 7, 1996 [DE] Germany .............................. 196 50 873

[51] Int. Cl.⁶ .................................................. B29C 53/08
[52] U.S. Cl. ........................ 264/564; 425/387.1; 425/391
[58] Field of Search ................................. 425/387.1, 391; 264/564

[56] References Cited

U.S. PATENT DOCUMENTS

| | | | |
|---|---|---|---|
| 4,022,860 | 5/1977 | Sugeno et al. ............................ | 264/559 |
| 4,081,562 | 3/1978 | Winkler .................................... | 426/390 |
| 4,336,222 | 6/1982 | Prohn ....................................... | 264/519 |
| 4,349,490 | 9/1982 | Bos ........................................... | 264/566 |
| 4,356,201 | 10/1982 | Winkler .................................. | 426/138 |

FOREIGN PATENT DOCUMENTS

| | | |
|---|---|---|
| 744 273 | 11/1996 | European Pat. Off. . |
| 2 343 576 | 4/1977 | France . |
| 25 01 287 | 7/1975 | Germany . |
| 25 19 621 | 11/1976 | Germany . |
| 30 13 989 | 3/1981 | Germany . |
| 1 219 930 | 1/1971 | United Kingdom . |
| 1 431 519 | 4/1976 | United Kingdom . |

*Primary Examiner*—Leo B. Tentoni
*Attorney, Agent, or Firm*—Foley & Lardner

[57] ABSTRACT

An apparatus 17 for continuously forming rings of thermoplastic, shrinkable tubular casings 1 includes an unwinding roller 20, a first pair of pinch rolls 2, a ring-forming tool 3, a second pair of pinch rolls 15 and a winding-up roller 21. The tubular casing 1 is passed from the unwinding roller 20 through the pair of pinch rolls 2 and runs along a running-zone A into the ring-forming tool 3, which includes a spiral 19 and guide rollers 7 and 8 on an outer side 5 and an inner side 6, respectively, of the tubular casing 1 as well as a heater 4 for generating hot air. After covering a running-out zone B, the ring casing 16 leaving the ring-forming tool 3 runs through the second pair of pinch rolls 15, which pinches off the gas blown in at low gauge pressure in the section of the tubular casing 1, or of the ring casing 16, between the first pair of rolls 2 and second pair of rolls 15, with the result that said gas remains only in the section mentioned. The ring casing 16 is laid flat along its center line of the ring by the second pair of pinch rolls 15 and is wound up in this state onto the winding-up roller 21, in order then to be shirred and filled in a further step of the process.

19 Claims, 3 Drawing Sheets

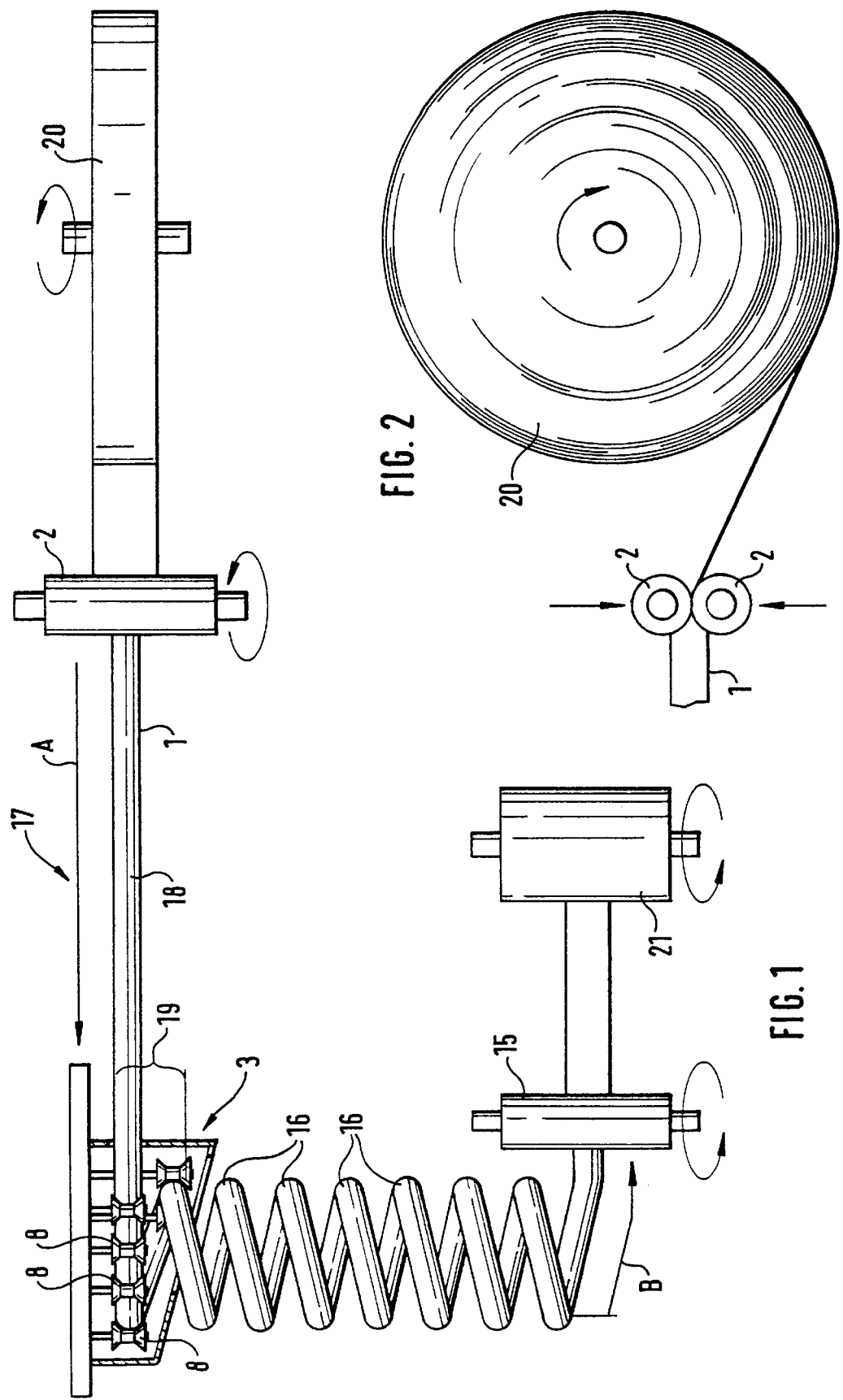

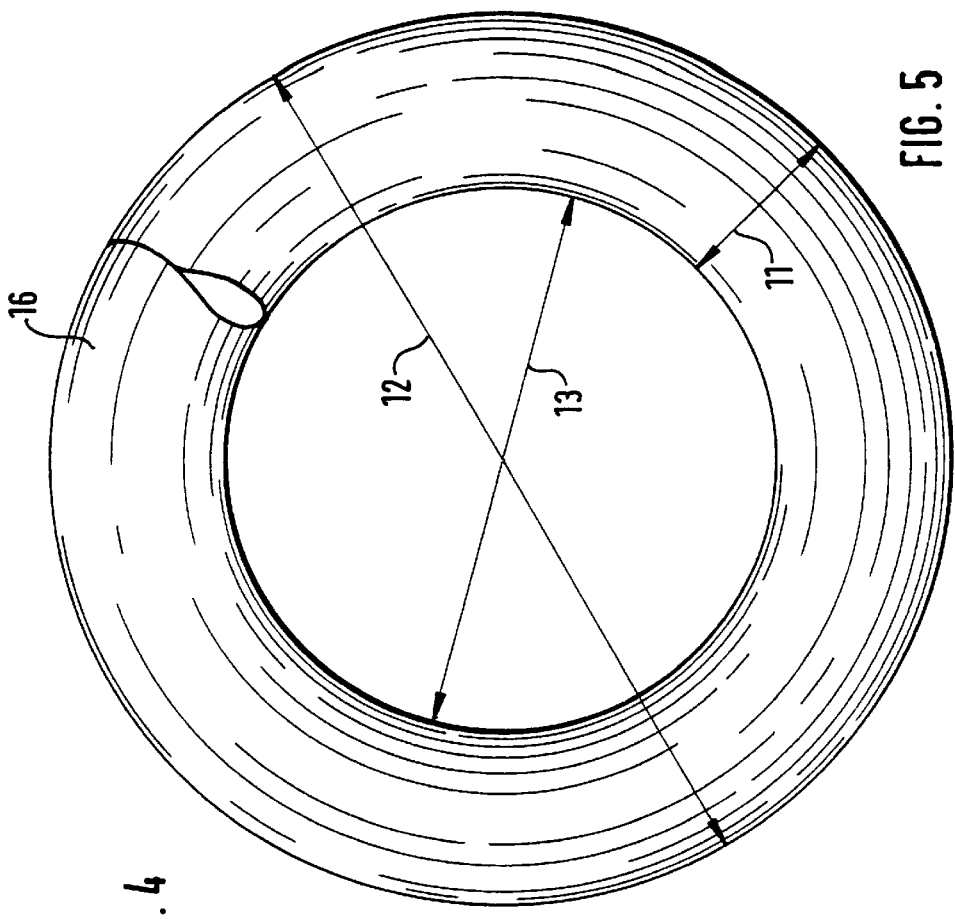
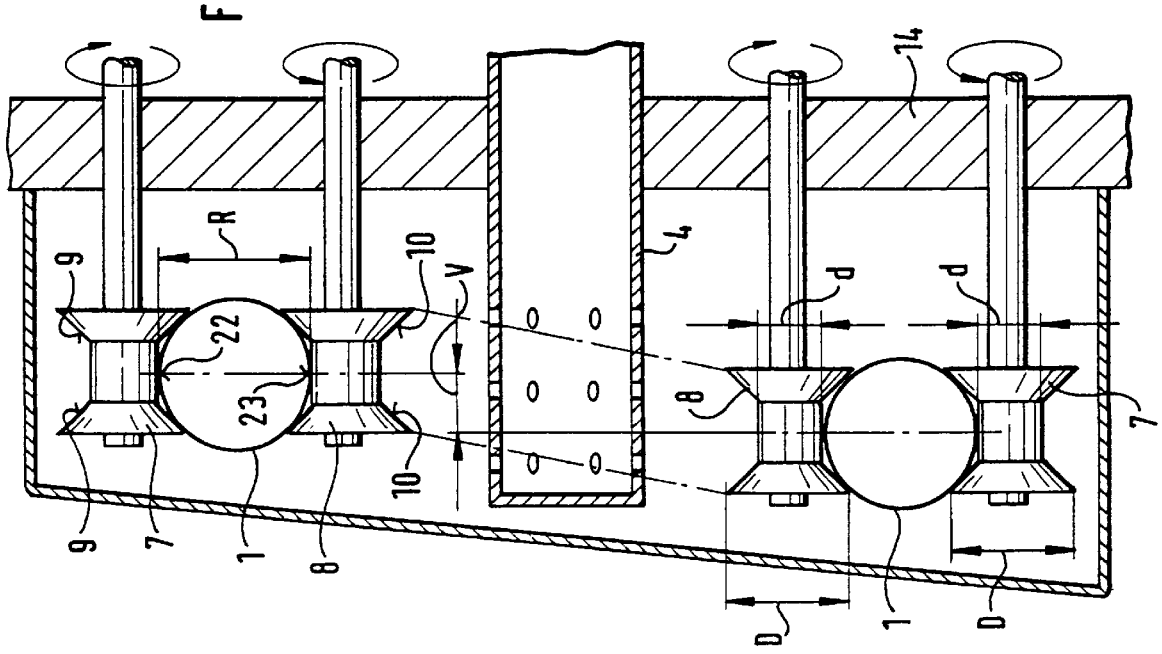

PROCESS AND APPARATUS FOR CONTINUOUSLY FORMING RINGS OF THERMOPLASTIC, SHRINKABLE TUBULAR CASINGS

BACKGROUND OF THE INVENTION

1. Field of the Invention

The present invention relates to a process for continuously forming rings of thermoplastic, shrinkable tubular casings by heat treatment of the inner side of a spiraled tubular casing in the inflated state, wherein the tubular casing is filled with compressed gas of low gauge pressure section by section before running into a ring-forming tool. The invention also relates to an apparatus for carrying out this process.

2. Description of the Related Art

Sausage casings are made from straight tubular casings, which are generally single-layer or multilayer polymer casings. The starting material for these casings is biaxially oriented. By filling such sausage casings with sausage meat, straight, cylindrical sausages are obtained. In addition to such elongate sausages, ring sausages or sausage rings are also produced, starting out as straight tubular casings, which are treated in ring-forming means or ring-forming tools in order to obtain so-called ring casings. Formation of the rings is based on the fact that the tubular casings are shrinkable. One-sided heat treatment of the inner side of these tubular casings causes shrinkage, whereby the straight tubular casing is curved.

Such processes and apparatuses for producing shrinkable tubular casings in ring form by one-sided heat treatment in the inflated state have long been known. For example, DE-B 23 22 220 discloses a process in which the heat treatment of the tubular casing is performed in three phases, the inner side of the spiraled tubular casing being brought initially to a temperature below, then to a temperature above and, finally again, to a temperature below the lower limit of the shrinkage-initiating temperature range.

The apparatus for carrying out this process comprises a partially heatable, at least one-piece and substantially cylindrical roll arrangement for the spiraling of the shrinkable thermoplastic tubular casings, with a pair of pinch rolls respectively arranged upstream and downstream of the roll arrangement. Between the pairs of rolls, a gas bubble is trapped in the tubular casing. The roll arrangement has end regions for receiving the tubular casing and for delivering the tubular casing, which are kept at a temperature below the shrinkage-initiating temperature, and a region lying in between for the heat treatment of the tubular casing, which is kept at a temperature in the shrinkage-initiating temperature range for the respective tubular casings. In this case, the roll arrangement is of a multipart design, and its individual parts are connected positively but releasably to one another. The guidance for the tubular casings comprises a spiral arranged on the surface of the rolls.

DE-A 30 31 944 discloses a process and an apparatus for curving tubular casings. In the process, the tubular casing is exposed during its curving path, on the one hand, to a contact and/or radiant that, and on the other hand, to a convective heat. The heat treatment by contact or radiation is sustained longer than the treatment with convective heat. The tubular casing is filled with gas or air directly before or after the heat treatment and is wound spirally over a mandrel, the successive turns lying against one another and the contact or radiant heat acting in the space which is enclosed by the spiral turns. The apparatus has a rotatable, smooth, heat mandrel, fixing means for fastening the tubular casing to be curved on the mandrel and an apparatus for feeding the tubular casing. Together with a housing, this feeding apparatus surrounds the mandrel, includes a heating apparatus and is displaceable along the mandrel. A drive apparatus displaces the feeding apparatus in at least one direction, the speed depending on the number of turns around the mandrel and on the diameter of the tubular casing winding around the mandrel.

DE-C 23 14 767 describes a process for producing edible, ring-shaped sausage casings by extrusion blow molding and helical taking off of the inflated extruded casing by depositing it on revolving surfaces which are arranged in a continuous sequence one behind the other and run around at the delivery rate of the casing from the extruder die. If appropriate, drying, hardening or tanning and/or softening are carried out simultaneously. The casing consisting of edible material is deposited on conical revolving surfaces passing through. The apparatus for carrying out the process has a plurality of driven carrying elements, arranged one behind the other, as a deposit for the extruded, inflated casing. An adjustable lifting-off means, angled with respect to the axis of the helix, has the form of a roller for transporting a casing from one carrying element to the next. The individual carrying elements have closed conical revolving surfaces and are driven by a central, joint drive shaft. The cone of the carrying elements becomes broader in the transporting direction of the casing, and the carrying elements have projections or ribs running in the direction of the axis of the helix.

DE-B 17 04 864 relates to a process and an apparatus for continuously producing endless, spirally curved plastic tubes or casings by extruding a hot polymer mass from an annular die mounted in a blow head, by expanding the still plastic tube by means of a metered amount of air, directed into the interior of the tube, and holding back this supplied amount of air in the tube by means of pinch rolls, wherein the tube is cooled differently over its circumference. The expanding tube is asymmetrically cooled before reaching its final and greatest diameter, and the curving tube is taken in a semicircle up to the pinching point. The apparatus comprises an extruder with screw and a blow head, which is provided with an air supply and has a concentric or eccentric annular die; pinch rolls for pinching off the blown air; and means for cooling the tube differently in individual sections. Arranged behind the blow head is a nozzle ring, inclined with respect to the axis of the tube, for blowing cooling air onto the tube from all sides. The nozzle ring comprises two half-rings arranged in different planes running transversely with respect to the axis of the tube and offset by 180° from each other.

WO 95/21052 discloses a process for continuously producing ring casings for sausages or hams, in which a thermoplastic cylindrical tubular casing which contains gas is wound up. A means for heat shrinkage has a multiplicity of pin-like rollers, which are arranged circumferentially and rotate about their axes, in order to spiral the tubular casing.

In the case of the known processes and apparatuses, it is necessary to prepare the tubular casing for the ring-forming process by initially winding it up on a winding drum and inflating it with compressed air. The continuous supply of compressed air is provided here from the winding drum. In this way, up to 2000 m of tubular casing can be prepared for the subsequent ring forming. The ring casing produced by the ring forming is portioned lengthwise and sectionally and is subsequently shirred, the individual ring spirals being processed. This portioning into individual ring spirals, filed with a specific air pressure, necessitates the previously described complete pre-winding and inflating of the tubular casing on the winding roller. In this case, the amount of equipment required for forming the rings is also considerable, since, for example, different regions of the ring-forming means have to be controlled such that they are at different temperatures.

SUMMARY OF THE INVENTION

One object of the invention is to provide a process which overcomes the disadvantages of the known art described above as well as an apparatus for ring forming, in such a way as to permit continuous ring forming of a tubular casing of any desired length with little equipment and uniform temperature distribution all around the tubular casing. Another object of the invention is to provide a method and apparatus for forming ring casings.

According to one aspect of the invention there has been provided a process for continuously forming ring-shaped thermoplastic, shrinkable tubular casings by heat treatment of the inner side of a spiraled tubular casing in an inflated state. The process includes inflating a section of a tubular casing with a compressed gas before passing into a ring-forming zone having a spiral path; and passing the inflated tubular casing into the ring-forming zone through at least a large part of the circumference of the spiral path, wherein the inflated tubular casing is heated and driven at different speeds on the inner side and outer side during its transport along the spiral path thereby forming the tubular casing into a ring casing, and wherein the heating is carried out uniformly over the circumference of the tubular casing and a predetermined temperature distribution around the circumference of the tubular ring casing is maintained.

According to another aspect of the invention, there has been provided an apparatus for continuously forming rings of thermoplastic, shrinkable tubular casings. The apparatus includes an at least partially heatable spiraled ring-forming tool, through which the tubular casings are passed; a first pair of pinch rolls arranged upstream of the ring-forming tool, adjustable in a direction toward and away from the ring-forming tool; a second pair of pinch rolls arranged downstream of the ring-forming tool, wherein said first and second pair of pinch rolls are adapted for trapping a gas bubble in the tubular casing, wherein the ring-forming tool includes a spiral path and further includes guide rollers that are arranged along at least a portion of the spiral path and are adapted to bear against the outer and inner sides of inflated tubular casing arranged along the spiral path, and wherein at least two pairs of guide rollers are driven; and a heat generator disposed within the inner circumference of the spiral for heating the inner side of the tubular casing located within the spiral.

Further objects, features and advantages of the present invention will become apparent to those skilled in the art from detailed consideration of the preferred embodiments which follow.

BRIEF DESCRIPTION OF THE DRAWINGS

In the drawings:

FIG. 1 shows a plan view of a diagrammatically represented apparatus for forming tubular casings into rings according to the invention;

FIG. 2 shows a side view of an unwinding roller of the apparatus according to FIG. 1;

FIG. 4 shows a sectional view through the ring-forming tool according to FIG. 3; and FIG. 5 shows a plan view of a ring casing.

DETAILED DESCRIPTION OF THE PREFERRED EMBODIMENTS

Figure 3:
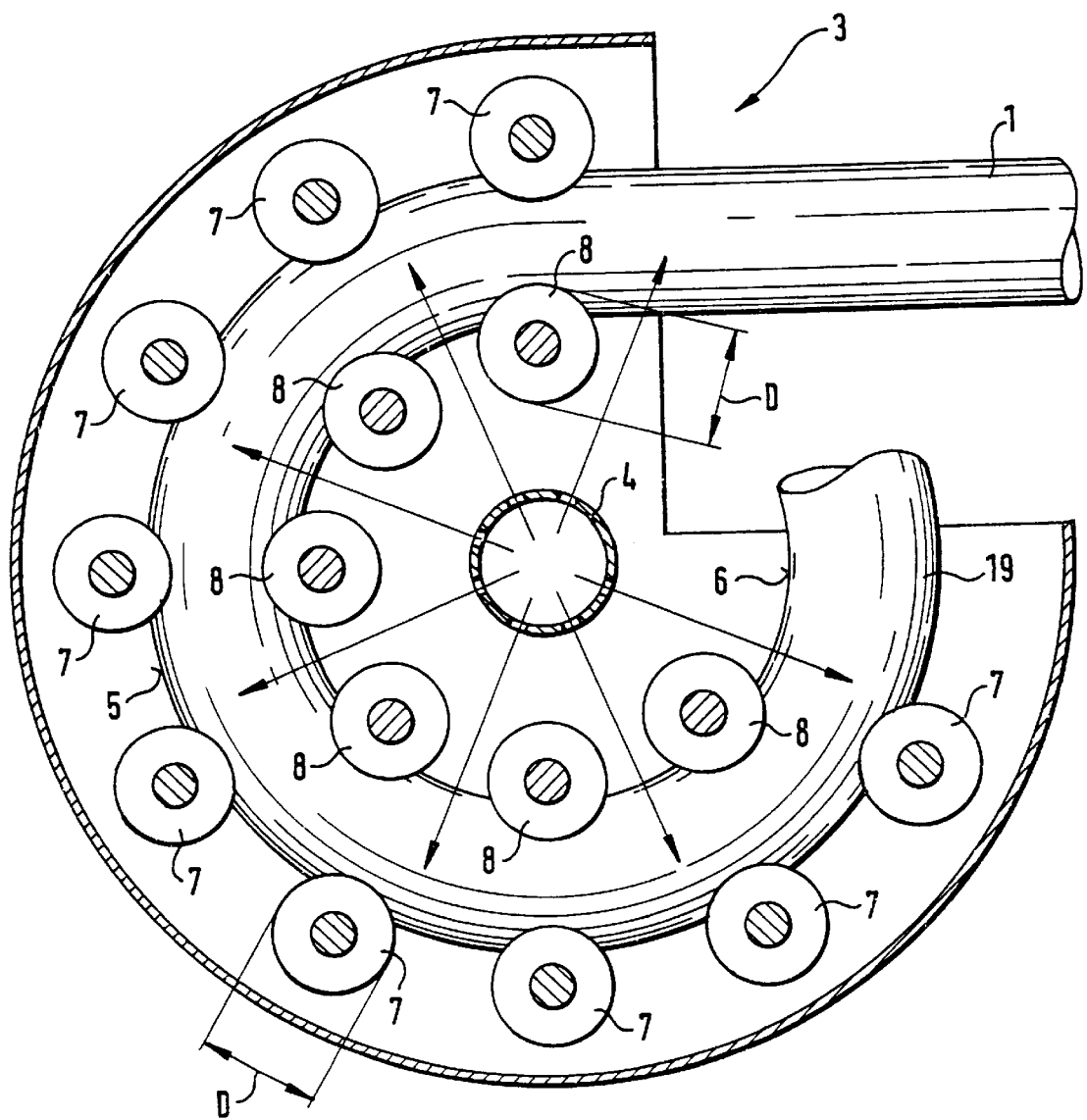
FIG. 3 shows a plan view of a diagrammatically represented ring-forming tool of the apparatus according to FIG. 1.

The process of the invention includes passing the tubular casing to a spiral over a large part of the circumference. The casing is heated and driven at different speeds on the inner side and outer side on its transporting path along the spiral and is thereby formed into a ring having a ring circumference. The process also includes heat, hot air, applied for heating the inner side of the tubular casing, to be distributed uniformly over the circumference of the tubular casing, and maintaining a predetermined temperature distribution around ring circumference of the tubular casing.

In the execution of this process, the tubular casing is shaped into a ring casing on three quarters of the circumference of the spiral, and the geometry of the ring casing in respect of the internal and external diameters of the ring and the caliber of the ring is predetermined by the guidance of the tubular casing along the spiral. At the same time, the gauge pressure of the gas in the tubular casing can be set before the tubular casing runs into the ring-forming tool, by shortening or lengthening an inflated section of the tubular casing. In one preferred embodiment of the process, the tubular casing is pinched off after leaving the ring-forming tool, and the compressed gas is squeezed out of the ring casing. The ring casing is at the same time laid flat along the center line of the ring and wound up.

The apparatus for continuously forming rings of thermoplastic, shrinkable tubular casings employs a partially heatable spiraled ring-forming tool, through which the tubular casings are passed, and a pair of pinch rolls respectively arranged upstream and downstream of the ring-forming tool. Between the pairs of rolls, a gas bubble is trapped in the tubular casing. In the apparatus, the first pair of pinch rolls is adjustable along a running-in-zone of the tubular casing before the ring-forming tool (i.e., adjustable in a direction toward and away from the ring-forming tool). The apparatus also includes a spiral design for the ring-forming tool and guide rollers which bear against the outer and inner sides of the inflated tubular casing being arranged along the spiral zone. At least two pairs of guide rollers are driven, and a heater means within the inner circumference of the spiral generates heat which heats the tubular casing from the inner side. A preferred heater means is a hot air blower or a radiant heater.

In one embodiment of the invention, the guide rollers driven on the outer side of the tubular casing can rotate at a higher speed than the guide rollers driven on the inner side of the tubular casing.

Other preferred embodiments of the apparatus are described as follows.

(1) The guide rollers driven on the outer side of the tubular casing rotate at a higher speed than the guide rollers driven on the inner side of the tubular casing.

(2) The number of guide rollers on the outer side of the tubular casing is greater than on the inner side.

(3) The first pair of driven guide rollers is arranged at the beginning of the spiral zone in the ring-forming tool. The second pair of driven guide rollers lie opposite the first pair of guide rollers half way around the circumference of the spiral with a horizontal offset.

(4) The guide rollers on the outer and inner sides of the tubular casing have equal internal and external diameters (d, D).

(5) The guide rollers on the outer side of the tubular casing have a greater external diameter (D) than the guide rollers on the inner side (6) of the tubular casing.

(6) The guide rollers are recessed and tangentially contact the tubular casing with sloping inner flanks of their recesses.

(7) A center-to-center distance (R) between the two guide rollers of a pair of driven rollers predetermines a ring caliber of the ring casing; the guide rollers on the inner side of the tubular casing establish an internal ring diameter, and the guide rollers on the outer side of the tubular casing establish an external ring diameter of the ring casing.

(8) The caliber of the ring is 20–70 mm and the internal ring diameter is 30–300 mm.

(9) The heating means is a hot-air blower or a radiant heater.

The invention achieves the advantages that the rate of production can be increased significantly, since a tubular casing of any desired length can be fed directly to the ring-forming tool and formed into a ring without the tubular casing first having to be inflated with a gas and wound up on a roller. The invention also includes the advantages that the tubular casing can be transported through the ring-forming tool at variable speeds and with very little friction, since there is no full contact of the tubular casing but only contact with the guide rollers confined to small regions. The invention also includes the advantage that the temperature distribution can be kept constant during the forming of the tubular casing into a ring with little control equipment. The invention is explained in more detail below with reference to the drawings.

An apparatus 17, diagrammatically represented in FIG. 1, for continuously forming rings of thermoplastic, shrinkable tubular casings comprises an unwinding roller 20, a first pair of pinch rolls 2, a ring-forming tool 3, a second pair of pinch rolls 15 and a winding-up roller 21. A tubular casing 1 is wound on the unwinding roller 20, which rotates clockwise during the unwinding of the tubular casing 1, as can be seen from FIG. 2. At the beginning of the unwinding, the folded-together tubular casing 1 is passed through the first pair of pinch rolls 2, which comprises two rolls or rollers which are pressed against each other in a way corresponding to the directions of the arrows in FIG. 2. Once a predetermined length of the tubular casing 1 has run through the first pair of pinch rolls 2, this section of the tubular casing 1 is filled with a gas, in particular with air, at an appropriate gauge pressure, for example with a compressed gas having a pressure of 0.2 to 0.8 bar above atmosphere pressure and the open end of the tubular casing 1 is closed, for example by a clip. In the tubular casing 1 there is then a gas bubble 18, which extends over the length of the running-in zone from the first pair of pinch rolls 2 to the end of the tubular casing 1 closed by a clip. The tubular casing 1 is then introduced into the ring-forming tool.

The inflated tubular casing 1 runs through the ring-forming tool and is shaped in the latter into a ring casing 16, as will be described in still further detail below. The pressure of the gas bubble 18 can be changed by moving the first pair of pinch rolls along the running-in zone A, since the amount of gas trapped in the tubular casing 1 is distributed over a longer or shorter section of the tubular casing according to the position of the pair of pinch rolls 2.

The ring casing 16 moves through a running-out zone B, which is parallel to the running-in-zone A and runs through the second pair of pinch rolls 15, which is preferably fixedly arranged, but can also be adjustable in a direction forward and away from the ring-forming tool. The gas bubble 18 is consequently trapped in the tubular casing 1, or in the ring casing 16, between the first pair of pinch rolls 2 and the second pair of pinch rolls 15. It is ensured by the pinching off of the predetermined amount of gas, or amount of air, by the second pair of pinch rolls 15 that an adequate gauge pressure of the gas for the ring-forming operation is always maintained. By this method, the amount of gas is no longer removed in small ring units, as is the case in the known processes, which make it necessary for constantly new gas to be blown into the tubular casing. The gas bubble 18, or gas cushion, is thus retained in its complete form between the two pairs of pinch rolls 2 and 15 over the entire length of the tubular casing or ring casing during the forming of the rings.

When the ring casing 16 passes through the second pair of pinch rolls 15, the ring casing 16 is pressed together flat and can then be wound onto the winding-up roller 21 without any problems, in order subsequently to be processed further by known shirring techniques.

The ring-forming tool 3, which is designed as a spiral 19, is shown diagrammatically in FIG. 3. Guide rollers 7 and 8 are arranged along the spiral 19. The spiral 19 extends, for example, over three quarters of the circumference of the ring-forming tool 3. The guide rollers 7 bear against an outer side of the inflated tubular casing 1, while the guide rollers 8 tangentially contact an inner side 6 of the tubular casing. Inside the spiral 19, there is a heater 4, which is, for example, a hot-air blower or a radiant heater, from which heat is given off radially in the direction of the inner side 6 of the tubular casing 1. The heat impinging on the inner side 6 causes shrinkage of the tubular casing 1 on the inner side 6, with the result that the initially straight tubular casing 1 curves in the from of a spiral or ring, the outer side 5 of the tubular casing being heated less intensively than the inner side 6. At least two pairs of guide rollers 7 and 8, these guide rollers respectively lying diametrically opposite, are driven. In this case, the two guide rollers 7, which bear against the outer side 5 of the tubular casing 1 and are driven, run at a higher speed than the two guide rollers 8, which bear against the inner side 6 of the tubular casing 1.

The number of guide rollers 7 on the outer side 5 of the tubular casing 1 is generally greater than the number on the inner side 6. The first pair of driven guide rollers 7 and 8 is located at the beginning of the spiral zone in the ring-forming tool 3, while the second pair of driven guide rollers 7 and 8 lie opposite the first pair half way around the circumference of the spiral. As can be seen from FIG. 4, there is a horizontal offset V between the center lines of the two pairs of guide rollers.

As can be seen from FIG. 4, the ring-forming tool 3 is surrounded by a housing 14, which, as a hot-air tunnel, encloses the guide rollers 7 on the outer side 5 of the tubular casing 1. The convective or radiant heat given off by the heater 4 heats the tubular casing 1, which is taken along the spiral 19. In a preferred embodiment, the hot air applied for the heating of the inner side 6 of the tubular casing 1 is distributed uniformly over the circumference of the tubular casing. This hot air is kept in the hot-air tunnel, with the result that there is established around the tubular casing 1 predetermined temperature distribution in which the inner side 6 is heated more intensely than the outer side 5 of the tubular casing 1.

The gauge pressure of the gas in the tubular casing 1 before it runs into the ring-forming tool 3 can be set by shortening or lengthening the gas-filled section of tubular casing or ring casing between the two pairs of pinch rolls 2 and 15. The length of this section is changed by moving the first pair of pinch rolls 2 along the running-in zone A. The gas bubble 18 in the ring casing 16 is pinched off before the latter is wound onto the winding-up roller 21, with the result that the gas present in the section of the ring casing 16, or the tubular casing 1 between the two pairs of pinch rolls 2 and 15 remains trapped. The gas is squeezed out of the ring casing 16 continuing after passing the second pair of pinch rolls 15, and the continuing ring casing is laid flat along its center line of the ring and wound up.

As can be seen from FIG. 4, the guide rollers 7 and 8 are recessed and have sloping inner flanks 9 and 10, respectively. Both the guide rollers 7 and the guide rollers 8 have in each case an external diameter D and an internal diameter d, the internal diameter d and the external diameter D of the guide rollers 7 and 8 being respectively equal. In a further embodiment (not shown), the guide rollers 7 on the outer side 5 of the tubular casing 1 may have a greater external diameter D than the guide rollers 8 on the inner side 6 of the tubular casing 1. The center-to-center distance R between two guide rollers 7 and 8 of a pair of driven rollers establishes a ring caliber 11 of the ring casing 16 (cf. FIG. 5). The sloping inner flanks 9 and 10 are adjoined respectively by an inner circumferential surface 22 of the guide roller 7 and an inner circumferential surface 23 of the guide roller 8. The center-to-center distance R is equal to the distance between the centers of the inner circumferential surfaces 22 and 23 of the two guide rollers 7 and 8.

FIG. 5 shows a plan view of the ring casing 16 having the ring caliber 11 which, as stated above, is established by the distance between the guide rollers 7 and 8 of the two driven pairs of rollers. An internal ring diameter 13 is established by the guide rollers 8 on the inner side 6 of the tubular casing 1, or by the internal radius of curvature of the spiral 19, while an external ring diameter 12 is predetermined by the guide rollers 7 on the outer side 5 of the tubular casing 1, or by the external radius of curvature of the spiral. The caliber of the ring is, for example, 20–70 mm and the internal ring diameter 13 lies in the range from 30–300 mm.

Other embodiments of the invention will be apparent to those skilled in the art from consideration of the specification and practice of the invention disclosed herein. It is intended that the specification be considered as exemplary only, with the true scope and spirit of the invention being indicated by the following claims.

Priority application German 196 50 873.8 filed on Dec. 7, 1996, including the specification, drawings, claims and abstract, is hereby incorporated by reference.

What is claimed is:

1. An apparatus for continuously forming ring-shaped thermoplastic, shrinkable tubular casings comprising:

an at least partially heatable spiraled ring-forming tool, through which the tubular casings are passed;

a first pair of pinch rolls arranged upstream of the ring-forming tool, adjustable in a direction toward and away from the ring-forming tool, a second pair of pinch rolls arranged downstream of the ring-forming tool, wherein said first and second pair of pinch rolls are adapted for trapping a gas bubble in the tubular casing, wherein the ring-forming tool includes a spiral path and further includes guide rollers arranged along at least a portion of the spiral path and are adapted to bear against the outer and inner sides of an inflated tubular casing arranged along the spiral path, wherein at least two pairs of guide rollers are driven; and a heater disposed within the inner circumference of the spiral path for heating the inner side of the tubular casing located within the spiral path.

2. The apparatus as claimed in claim 1, wherein the driven guide rollers are arranged on the inner and outer side of the spiral path and wherein the guide rollers driven on the outer side of the spiral path rotate at a higher speed than the guide rollers driven on the inner side of the spiral path.

3. The apparatus as claimed in claim 1, wherein the number of guide rollers on the outer side of the spiral path is greater than the number of guide rollers on the inner side.

4. The apparatus as claimed in claim 1, wherein a first pair of driven guide rollers is arranged at the beginning of the spiral path, and wherein a second pair of driven guide rollers lies opposite the first pair of guide rollers half way around the circumference of the spiral path and has a horizontal offset with respect to the first pair of driven guide rollers.

5. The apparatus as claimed in claim 1, wherein the guide rollers on the outer and inner sides of the spiral path have equal internal and external diameters.

6. The apparatus as claimed in claim 1, wherein the guide rollers on the outer side of the spiral path have a greater external diameter than the guide rollers on the inner side of the spiral path.

7. The apparatus as claimed in claim 1, wherein the guide rollers are recessed and are adapted to tangentially contact the tubular casing with sloping inner flanks of their recesses.

8. The apparatus as claimed in claim 1, wherein a center-to-center distance between the two guide rollers of a pair of driven rollers arranged on opposite sides of the spiral path predetermines the caliber of the tubular casing, and wherein the guide rollers on the inner side of the tubular casing in the spiral path defines an internal ring diameter of the tubular casing, and wherein the guide rollers on the outer side of the tubular casing in the spiral path defines an external ring diameter of the ring casing.

9. The apparatus as claimed in claim 8, wherein the guide rollers are arranged such that the caliber of the casing is 20–70 mm and the internal ring diameter is 30–300 mm.

10. The apparatus as claimed in claim 1, wherein the heater means comprises a hot-air blower or a radiant heater.

11. The apparatus as claimed in claim 1, wherein the ring-forming tool further comprises a housing, which, as a hot-air tunnel, encloses at least a portion of the guide rollers on the outer side of the spiral path.

12. The apparatus as claimed in claim 1, wherein the second pair of pinch rolls is arranged in a running-out zone of the ring casing, wherein the second pair of pinch rolls are adapted for pinching-off the gas bubble in the ring casing before the ring casing is wound up, whereby the gas present in the section of the ring casing, or the tubular casing, remains trapped between the first and second pairs of pinch rolls.

13. The apparatus as claimed in claim 12, wherein the second pair of pinch rolls is adjustable in a direction toward and away from the ring-forming tool.

14. The apparatus as claimed in claim 12, further comprising a winding-up roller arranged downstream of the second pair of pinch rolls.

15. A process for continuously forming ring-shaped thermoplastic, shrinkable tubular casings, with the apparatus of claim 1, comprising:

inflating a section of a tubular casing with a compressed gas, to produce a casing tube having a tube circumference, before passing the tubular casing into a ring-forming zone of the ring-forming tool having a generally spiral path; and passing the inflated tubular casing into the ring-forming zone through at least a large part of the circumference of the spiral path, thereby forming the tubular casing into a ring casing having a ring circumference, wherein the inflated tubular casing is heated with the heater and is driven at different speeds on the respective inner side and outer side of its ring circumference, during its transport along the spiral path by the at least two driven guide rolls, and wherein the heating is carried out uniformly over the ring circumference of the tubular casing and a predetermined temperature distribution around the tube circumference of the tubular ring casing is maintained.

16. The process as claimed in claim 1, wherein at least a large part of the spiral path circumference comprises at least three quarters of the circumference of the spiral path, and wherein the geometry of the ring casing with respect to the internal and external diameters of the ring and the caliber of the ring is predetermined by the guidance of the tubular casing along the spiral path.

17. The process as claimed in claim 16, wherein the tube caliber of the ring is from 20–70 mm and the internal ring diameter is from 30–300 mm.

18. The process as claimed in claim 15, further comprising setting the gauge pressure of the gas in the tubular casing by adjusting the length of the inflated section of the tubular casing.

19. The process as claimed in claim 15, further comprising pinching off the ring casing after it leaves the ring-forming tool;

squeezing the compressed gas out of the ring casing as it is pinched-off to form a non-inflated ring casing downstream of the pinching-off and maintaining an inflated ring casing upstream of the pinching-off;

lying the non-inflated ring casing flat along its center line of the ring; and winding up the non-inflated ring casing.

\* \* \* \* \*